Apr. 10, 1923.  1,451,232
A. O. MURDOCK
RESERVE OIL TANK AND GAUGE FOR AUTOMOBILES
Filed Dec. 1, 1921
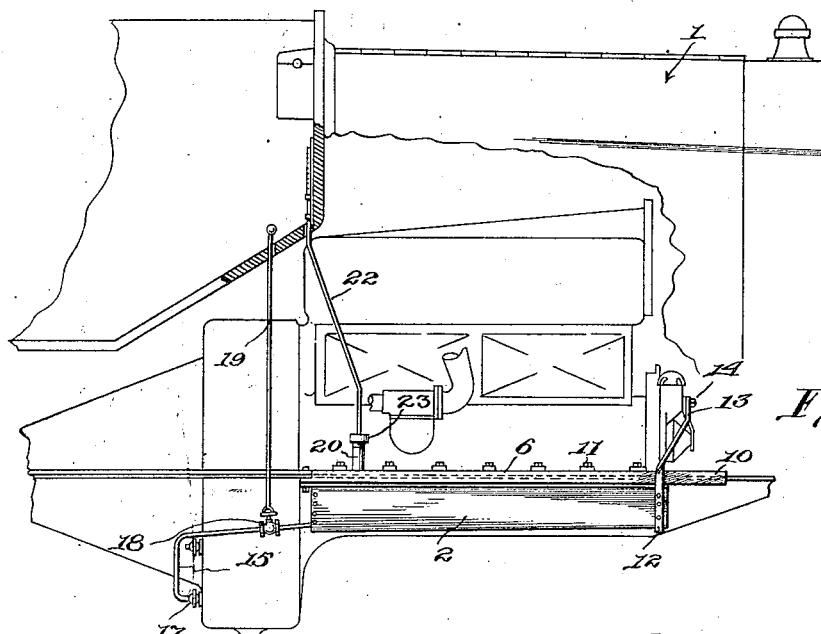
Fig.1.
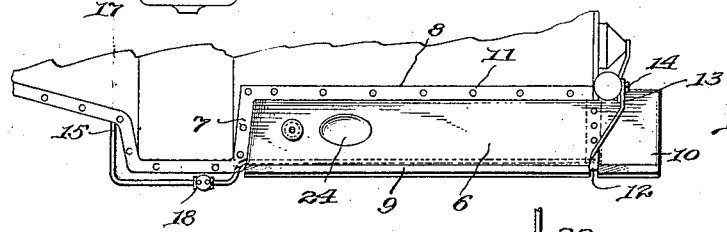
Fig.2.
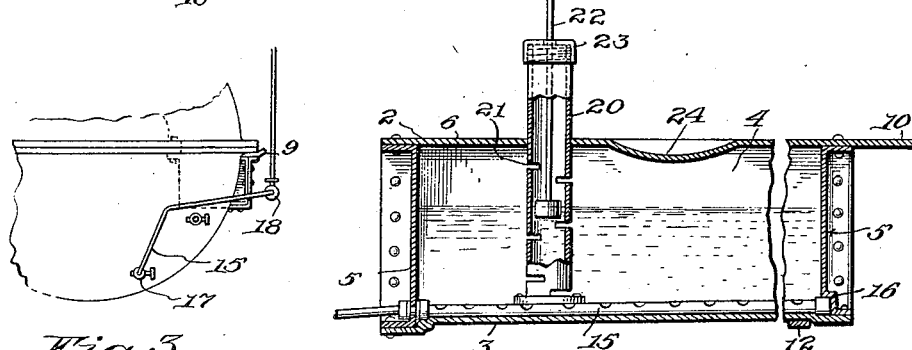
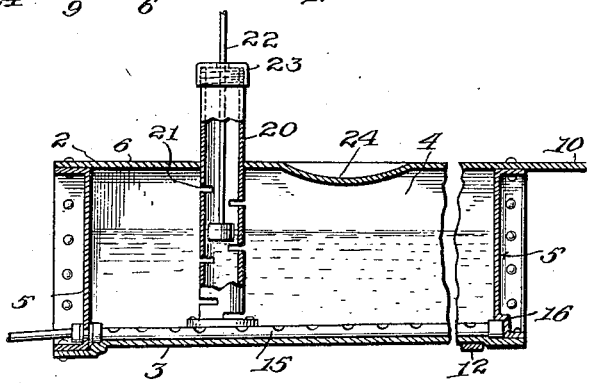
Fig.3.
Fig.4.
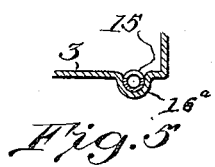
Fig.5.
Inventor
Albert O. Murdock
Eccleston & Eccleston
Attorneys Patented Apr. 10, 1923.

1,451,232

UNITED STATES PATENT OFFICE.

ALBERT O. MURDOCK, OF FORT PAYNE, ALABAMA.

RESERVE OIL TANK AND GAUGE FOR AUTOMOBILES.

Application filed December 1, 1921. Serial No. 519,152.

*To all whom it may concern:*

Be it known that I, ALBERT O. MURDOCK, a citizen of the United States, residing at Fort Payne, in the county of Dekalb and State of Alabama, have invented certain new and useful Improvements in Reserve Oil Tanks and Gauges for Automobiles, of which the following is a full, clear, and exact description.

My invention relates to a reserve oil tank for automobiles generally, but more particularly for Ford cars, and has for its object to provide such a device which may be attached to the engine as now on the market without the use of any extra bolts or fastening devices.

Another object of the invention is the provision of means for attaching the reserve tank solely to the engine in order that the tank will receive only such vibrations as are transmitted to the engine.

Other objects and advantages of the invention will be apparent from the following description when taken in connection with the accompanying drawing, in which, Figure 1 is a fragmentary side view of an automobile with the tank in place.

Figure 2 is a plan view of the tank attached at the side of the engine.

Figure 3 is a rear view of the tank attached to the engine.

Figure 4 is a longitudinal section therethrough partly broken away, and,

Figure 5 is a detail section through the bottom of the tank.

Referring to the drawing more in detail, the numeral 1 designates an automobile of well known type to which my reserve oil tank, designated by the numeral 2, is attached. The tank 2 is composed of integral bottom and side walls 3 and 4 respectively, and separate end walls 5. The top wall 6 is formed of a separate sheet of metal of greater area than the body of the tank and is secured thereto so as to provide the overhanging flanges 7 and 8 and also the flanges 9 and 10. The flanges 7 and 8 are formed with bolt holes for reception of the usual bolts 11 which secure the crank case to the engine proper. The tank with the flanges 9 and 10 form, in effect, a splash pan to guard the engine from mud, etc.

As an additional means for supporting the tank at the side of the engine, I have provided a strap 12 which is secured to the bottom and both sides of the tank near one end thereof and extends upwardly to form the arm 13, which is secured to the bolt 14 which locks the timer in place on the engine.

A notched pipe 15, located at the bottom of the tank 2, has its end held in the tank at the proper position by means of the shouldered portion 16 on the end wall of the tank. This pipe is also seated in the groove 16$^a$ in the bottom wall of the tank in order that the tank may be completely drained and also to more securely hold the pipe in position. The opposite end of the pipe is connected to the lower test-cock 17 on the engine crank case. In order to regulate the flow of oil from the reserve oil tank, I have provided the valve 18 in the pipe line, and a valve operating rod 19 extends from the valve 18 to the dash of the automobile, whereby the driver may operate the same without leaving his seat.

An oil gauge comprising the slotted cylinder 20 secured to the bottom of the tank, the float 21, and the extension 22, which is located on the dash, is provided for indicating the amount of oil in the tank. The cylinder 20 is provided with a screw cap 23 which may be removed when it is desired to fill the tank or for any other purpose. A depression 24 is formed in the top wall of the tank to provide for the proper draining of the carbureter when necessary.

In accordance with the patent statutes, I have described what I now believe to be the best embodiment of my invention, but I do not wish to be understood thereby as limiting myself or the scope of my invention, as many modifications may be made without departing from the spirit of the invention, and all such I aim to include in the scope of the appended claims.

What I claim as new and desire to secure by Letters Patent is:

1. The combination with an automobile engine of a reserve oil tank shaped to fit the space between the engine and the automobile body, means for securing the tank to the engine body, said means including a strap secured to one end of the tank and to the timer bolt.

2. The combination with an automobile engine of a reserve oil tank located at the side of the engine, a flange on one edge of the tank whereby the same may be bolted to the engine, and a strap on the tank, one end of the strap being secured to the engine timer bolt.

3. The combination with an automobile engine of a reserve oil tank located at the side of the engine, the upper wall of the tank being of greater area than the tank body and extending beyond the same at one side and end, means for attaching the upper wall of the tank to the engine, and a strap for supporting one end of the tank from the timer bolt.

ALBERT O. MURDOCK.